United States Patent [19]

Nishimura et al.

US005756586A

[11] Patent Number: 5,756,586
[45] Date of Patent: May 26, 1998

[54] VULCANIZABLE RUBBER COMPOSITION WITH UNSATURATED AND METAL COMPOUNDS AND ORGANIC PEROXIDES

[75] Inventors: Koichi Nishimura, Kanagawa; Yoshiomi Saito, Chiba; Kazuyoshi Nakajima, Tokyo; Atsushi Tanaka; Yasuaki Serizawa, both of Kanagawa, all of Japan

[73] Assignee: Nippon Zeon Co., Ltd., Tokyo, Japan

[21] Appl. No.: 530,180

[22] PCT Filed: Mar. 31, 1994

[86] PCT No.: PCT/JP94/00528

§ 371 Date: Sep. 29, 1995

§ 102(e) Date: Sep. 29, 1995

[87] PCT Pub. No.: WO94/22947

PCT Pub. Date: Oct. 13, 1994

[30] Foreign Application Priority Data

Mar. 31, 1993 [JP] Japan .................................. 5-097157
Mar. 31, 1993 [JP] Japan .................................. 5-097158

[51] Int. Cl.$^6$ .................................................. C08F 265/02
[52] U.S. Cl. ........................... 525/301; 525/262; 525/263; 525/265
[58] Field of Search ................................ 525/301, 263, 525/265, 262

[56] References Cited

U.S. PATENT DOCUMENTS 4,056,269  11/1977  Pollitt ............................... 525/301

FOREIGN PATENT DOCUMENTS

| 57-37459 | 3/1982 | Japan . |
| 58-19344 | 2/1983 | Japan . |
| 58-101131 | 6/1983 | Japan . |
| 1-306441 | 12/1989 | Japan . |
| 1-306443 | 12/1989 | Japan . |
| 3748 | 1/1991 | Japan . |
| 44240 | 1/1992 | Japan . |

*Primary Examiner*—Christopher Henderson
*Attorney, Agent, or Firm*—Lowe, Price, LeBlanc & Becker

[57] ABSTRACT

This invention relates to a vulcanizable rubber composition obtained by compounding, into an ethylenically unsaturated nitrile-conjugated diene copolymer rubber, a zinc compound, an $\alpha$, $\beta$-ethylenically unsaturated carboxylic acid, a compound of a 2A Group metal of the periodic table and an organic peroxide. The vulcanizable rubber composition of this invention can provide a vulcanized rubber having excellent heat resistance and oil resistance and moreover possessing high tensile stress or stably exhibiting high tensile strength without being affected by kneading conditions, and is hence suitable for use as a rubber material for toothed belts and the like.

5 Claims, No Drawings

5,756,586

VULCANIZABLE RUBBER COMPOSITION WITH UNSATURATED AND METAL COMPOUNDS AND ORGANIC PEROXIDES

TECHNICAL FIELD

The present invention relates to a vulcanizable rubber composition comprising an ethylenically unsaturated nitrile-conjugated diene copolymer rubber, and more particularly to a vulcanizable rubber composition which can provide a vulcanized rubber having excellent heat resistance and oil resistance and moreover stably exhibiting high tensile strength without being affected by kneading conditions.

The vulcanizable rubber composition according to the present invention is suitable for use in, particularly, fields of which high tensile stress or tensile strength is required, for example, as a rubber material for toothed belts, V-belts, packings, hoses, rubber rolls and the like.

BACKGROUND ART

It has heretofore been known that when the zinc salt of methacrylic acid, such as zinc dimethacrylate or basic zinc methacrylate, is compounded into an ethylenically unsaturated nitrile-conjugated diene copolymer rubber, and the rubber is vulcanized with an organic peroxide, a vulcanized rubber excellent in various physical properties such as tensile strength can be obtained. The zinc salt of methacrylic acid may be compounded either in the form of the salt itself prepared in advance or by compounding methacrylic acid and a zinc compound (zinc oxide, zinc carbonate, zinc hydroxide or the like) into the copolymer rubber and reacting them in the rubber, thereby forming the salt.

For example, Japanese Patent Application Laid-Open No. 306441/1989 has disclosed that a vulcanizable rubber composition obtained by compounding methacrylic acid, a zinc compound and an organic peroxide into an ethylenically unsaturated nitrile-conjugated diene copolymer rubber provides a vulcanized rubber having high tensile strength. Japanese Patent Application Laid-Open No. 306443/1989 has disclosed that a vulcanizable rubber composition obtained by compounding methacrylic acid, a zinc compound and an organic peroxide into an ethylenically unsaturated nitrile-conjugated diene copolymer rubber containing conjugated diene units in an amount of at most 30 wt. % provides a vulcanized rubber exhibiting extremely high tensile strength compared with the conventional rubbers.

However, the conventional vulcanizable rubber compositions obtained by blending methacrylic acid, a zinc compound and an organic peroxide with an ethylenically unsaturated nitrile-conjugated diene copolymer rubber has involved a problem that they cannot provide vulcanized rubbers having sufficiently high tensile stress.

When a rubber material is used in a belt, hose or the like, it must have high tensile stress. In particular, a rubber material having high tensile stress together with properties such as excellent heat resistance, oil resistance, tensile strength and processability is required for the application to various toothed belts driven under a high load. A toothed belt is generally formed from a surface coating layer composed of canvas or the like, a rubber layer for forming and holding a toothed part (tooth form), and a reinforcing cord (core) embedded in the rubber layer, and is used as a power transmission means. The toothed belt suffers high stress at the root of each tooth when transmitting the power in mesh with a pulley. In order to withstand this high stress, the tensile stress of the rubber layer which forms and holds the toothed part must be made high.

In general, as an example of a method for enhancing the tensile stress of rubber, may be mentioned a method in which the compounding proportion of a reinforcing material for the rubber, such as carbon black or silica is increased to improve the hardness of the resulting vulcanized rubber. In this case, however, the viscosity of an unvulcanized rubber becomes too high, resulting in deteriorated processability.

Examples of other methods for enhancing the tensile stress of rubber include a method in which the amount of a vulcanizing agent is increased, and a method in which a crosslinking aid such as triallyl isocyanulate or trimethylolpropane triacrylate is added. However, these methods involve problems that the resulting vulcanized rubber is deteriorated in elongation and that a disadvantage is also encountered from the viewpoint of cost.

In addition, the vulcanizable rubber composition obtained by compounding methacrylic acid, a zinc compound and an organic peroxide into an ethylenically unsaturated nitrile-conjugated diene copolymer rubber have involved a problem that strength properties such as tensile strength vary according to preparation conditions such as a kneading temperature. In a vulcanizable rubber composition, it is desirable that its strength properties should not be affected by variations in temperature conditions upon the kneading. Further, the kneading of the vulcanizable rubber composition at a too high temperature tends to cause the deterioration of the copolymer rubber and the reduction of physical properties of the resulting vulcanized rubber due to polymerization of the zinc salt of methacrylic acid and the like, and applies a heavy load to a kneading machine. It is therefore desirable that a vulcanizable rubber composition should stably provide a vulcanized rubber having high strength properties even when kneaded at a comparatively low temperature.

Accordingly, it has been an important technical problem to be solved in the vulcanizable rubber compositions containing an ethylenically unsaturated nitrile-conjugated diene copolymer rubber as described above to highly improve the tensile stress of the resulting vulcanized rubber or to provide a vulcanized rubber stably exhibiting high tensile strength even when preparation conditions such as kneading temperature vary. However, there has heretofore not been found under the circumstances any useful means for solving such a technical problem.

It has heretofore been known to cause various additives to coexist upon the reaction of methacrylic acid and a zinc compound in a rubber to form zinc methacrylate therein.

For example, Japanese Patent Application Laid-Open No. 37459/1982 has disclosed a method in which calcium oxide or active aluminum oxide is added as a dehydrating agent upon the reaction of methacrylic acid and zinc oxide in a rubber with a small amount of a natural rubber or a polyisoprene rubber blended into a polybutadiene rubber, thereby adsorbing and dehydrating water formed by the reaction. According to this method, a vulcanized rubber having high impact resilience and fit for golf balls can be obtained.

Japanese Patent Application Laid-Open No. 19344/1983 has disclosed the fact that when calcium hydroxide is caused to exist upon the reaction of methacrylic acid and zinc oxide in a polybutadiene rubber, the formation of basic zinc methacrylate is prevented, thereby obtaining a vulcanized rubber having high impact resilience.

Japanese Patent Application Laid-Open No. 101131/1983 has disclosed the fact that when the calcium salt of methacrylic acid is caused to exist upon the reaction of methacrylic acid and zinc oxide in a polybutadiene rubber, zinc dimethacrylate is formed, thereby obtaining a vulcanized rubber having high impact resilience.

However, all of these prior art documents relate to golf balls making use of a rubber composed principally of a polybutadiene rubber and have as their object the improvement of impact resilience.

DISCLOSURE OF THE INVENTION

It is an object of the present invention to provide an ethylenically unsaturated nitrile-conjugated diene copolymer rubber composition which can provide a vulcanized rubber stably exhibiting high tensile strength without being affected by preparation conditions such as kneading temperature, and desirably even upon kneading at a comparatively low temperature.

It is another object of the present invention to provide vulcanized rubber moldings such as a toothed belt improved in tensile strength.

The present inventors have carried out an extensive investigation. As a result, it has been found that when an $\alpha,\beta$-ethylenically unsaturated carboxylic acid and a zinc compound are compounded into an ethylenically unsaturated nitrile-conjugated diene copolymer rubber to form the zinc salt of the $\alpha,\beta$-ethylenically unsaturated carboxylic acid, and the copolymer rubber is vulcanized with an organic peroxide, thereby producing a vulcanized rubber, the above objects can be achieved by compounding a compound of an alkaline earth metal into an unvulcanized rubber composition.

Among compounds of 2A Group metals of the periodic table, in particular, the use of a magnesium compound has been found to highly improve tensile stress. (Referential Example). The use of a compound of an alkaline earth metal such as calcium can achieve high tensile strength even when preparation conditions such as kneading temperature vary, or kneading is performed at a comparatively low temperature. Accordingly, when the kind of the compound of a 2A Group metal of the periodic table is selected as necessary for the end application intended, or two or more compounds are suitably combined, a vulcanizable rubber composition and a vulcanized rubber having the desired properties can be obtained. The present invention has been led to completion on the basis of these finding.

According to the present invention, there is thus provided a vulcanizable rubber composition obtained by compounding, per 100 parts by weight of an ethylenically unsaturated nitrile-conjugated diene copolymer rubber, the following components:

(a) 5–80 parts by weight of a zinc compound;

(b) 5–100 parts by weight of an $\alpha,\beta$-ethylenically unsaturated carboxylic acid;

(c) 0.5–30 parts by weight of a compound of an alkaline earth metal; and (d) 0.2–10 parts by weight of an organic peroxide.

According to the present invention, there is also provided a vulcanized rubber molding obtained by molding the vulcanizable rubber composition described above in the desired form and then vulcanizing the thus-molded rubber composition.

According to the present invention, there is further provided a toothed belt obtained by using the vulcanizable rubber composition described above to mold a tooth back and a toothed part of the toothed belt and then vulcanizing the thus-molded rubber composition.

The present invention will hereinafter be described in detail.

As examples of the ethylenically unsaturated nitrile-conjugated diene copolymer rubber useful in the practice of the present invention, may be mentioned copolymer rubbers of an ethylenically unsaturated nitrile such as acrylonitrile, methacrylonitrile or $\alpha$-chloro-acrylonitrile with a conjugated diene such as 1,3-butadiene, isoprene, 1,3-pentadiene or 2,3-dimethyl-1,3-butadiene; hydrogenated copolymer rubbers obtained by hydrogenating the conjugated diene units of these copolymer rubbers; polymonomeric copolymer rubbers of two monomers of an ethylenically unsaturated nitrile and a conjugated diene with at least one monomer copolymerizable therewith, for example, a vinyl aromatic compound, an alkyl ester of an ethylenically unsaturated carboxylic acid, an alkoxyalkyl ester of an ethylenically unsaturated carboxylic acid, a fluoroalkyl ester of an ethylenically unsaturated carboxylic acid, a cyano-substituted alkyl ester of (meth)acrylic acid or the like; and hydrogenated copolymer rubbers obtained by hydrogenating the conjugated diene units of these polymonomeric copolymer rubbers.

Specific examples of the ethylenically unsaturated nitrile-conjugated diene copolymer rubber include acrylonitrile-butadiene copolymer rubber (NBR), acrylonitrile-butadiene-isoprene copolymer rubber (NBIR), acrylonitrile-isoprene copolymer rubber (NIR), acrylonitrile-butadiene-acrylate copolymer rubber, acrylonitrile-butadiene-acrylic acid copolymer rubber, acrylonitrile-butadiene-acrylate-methacrylic acid copolymer rubber, and hydrogenated copolymer rubbers obtained by hydrogenating the above copolymer rubbers, such as a hydrogenated product of acrylonitrile-butadiene copolymer rubber (HNBR). These copolymer rubbers may be used either singly or in any combination thereof.

These copolymer rubbers contain ethylenically unsaturated nitrile units in a proportion of generally 10–60 wt. %, preferably 20–50 wt. % in their polymer chains. If the content of the ethylenically unsaturated nitrile units is lower than 10 wt. %, the resulting vulcanized rubber is insufficient in oil resistance. On the other hand, any content exceeding 60 wt. % results in a vulcanized rubber deteriorated in resiliency. It is hence not preferable to use any copolymer rubber containing the ethylenically unsaturated nitrile units in a proportion outside the above range.

As examples of the zinc compound, may be mentioned zinc oxide, zinc carbonate and zinc hydroxide.

As examples of the $\alpha,\beta$-ethylenically unsaturated carboxylic acid, may be mentioned unsaturated monocarboxylic acids such as acrylic acid, methacrylic acid, crotonic acid and 3-butenic acid; unsaturated dicarboxylic acids such as maleic acid, fumaric acid and itaconic acid; monoesters of unsaturated dicarboxylic acids, such as monomethyl maleate, monomethyl fumarate and monomethyl itaconate; unsaturated polycarboxylic acids other than the above; and esters of the unsaturated polycarboxylic acids, in which at least one free carboxyl group remains intact. Of these, methacrylic acid is particularly preferred from the viewpoint of physical properties and easy availability.

When the zinc compound and the $\alpha,\beta$-ethylenically unsaturated carboxylic acid are added to the ethylenically unsaturated nitrile-conjugated diene copolymer rubber, and the resultant mixture is kneaded, they are reacted in situ in the copolymer rubber to form the zinc salt of the $\alpha,\beta$-ethylenically unsaturated carboxylic acid. In this case, it is preferable from the viewpoint of improvement in strength properties such as tensile strength of the resulting vulcanized rubber to use, as the zinc compound, that from which coarse particles having a particle diameter of at least 20 μm have been removed by classification in advance, thereby reducing the coarse particle content thereof to at most 5 wt. %.

The compounding proportion of the zinc compound is generally 5–80 parts by weight, preferably 10–60 parts by weight per 100 parts by weight of the ethylenically unsaturated nitrile-conjugated diene copolymer rubber. The compounding proportion of the α,β-ethylenically unsaturated carboxylic acid is generally 5–100 parts by weight, preferably 20–60 parts by weight per 100 parts by weight of the ethylenically unsaturated nitrile-conjugated diene copolymer rubber. A molar ratio of the α,β-ethylenically unsaturated carboxylic acid to the zinc compound calculated on the basis of the molecular weight of the α,β-ethylenically unsaturated carboxylic acid and the formula weight of the zinc compound is generally within a range of from 1:0.5 to 1:3.2, preferably from 1:0.5 to 1:2.5.

In the present invention, the compounding of a compound of an alkaline earth metal permits the obtainment of a vulcanizable rubber composition which can stably provide a high-strength vulcanized rubber without changing strength properties according to its preparation conditions such as kneading temperature.

As examples of the compound of the alkaline earth metal, may be mentioned the oxides, hydroxides, peroxides, carbonates, carbonate oxides, carbonate hydroxides, sulfates, nitrates, acetates, oxalates, phosphinates, phosphonates, phosphates, hydrogenphosphates and ammonium phosphates of calcium, strontium, barium and the like.

As specific examples of the compound of the alkaline earth metal, may be mentioned, calcium compounds such as calcium oxide, calcium peroxide, calcium hydroxide, calcium sulfate, calcium nitrate, calcium, carbonate, calcium acetate, calcium oxalate, calcium phosphinate, calcium phosphonate and calcium phosphate; strontium compound such as strontium oxide, strontium peroxide, strontium hydroxide, strontium sulfate, strontium nitrate, strontium acetate, strontium carbonate, strontium oxalate and strontium phosphate; barium oxide, barium peroxide, barium hydroxide, barium sulfate, barium nitrate, barium carbonate, barium oxalate, barium phosphinate, barium phosphonate and barium phosphate; and mixtures of two or more these compounds.

Of these metal compounds, the oxides and hydroxides of the alkaline earth metals are preferred. Of these, in particular, the use of calcium oxide and calcium hydroxide permits the stable provision of a high-strength vulcanized rubber without changing strength properties such as tensile strength according to its preparation conditions such as kneading temperature. Accordingly, it is desirable to select these metal compounds or use two or more of them in combination as necessary for the intended end application and desired properties of the resulting vulcanized rubber, and the like.

The compound of an alkaline earth metal is generally compounded in a proportion of 0.5–30 parts by weight, preferably 0.5–20 parts by weight, more preferably 1–10 parts by weight per 100 parts by weight of the ethylenically unsaturated nitrile-conjugated diene copolymer rubber. If this compounding proportion is too low, the tensile stress-improving effect is not sufficiently exhibited. On the other hand, if the proportion is too high, the strength properties show a tendency to deteriorate. Therefore, it is not preferable to use the metal compound in such a low or high proportion. With respect to the alkaline earth metal compound such as calcium oxide or calcium hydroxide, it is preferable from the viewpoint of the stable provision of a high-strength vulcanized rubber to compound it in a proportion of at least 2 parts by weight.

Examples of the organic peroxide include dicumyl peroxide, di-t-butyl peroxide, t-butylcumyl peroxide, benzoyl peroxide, 2,5-dimethyl-2,5-(t-butyl peroxy)hexyne-3, 2,5-dimethyl-2,5-di(benzoyl peroxy)hexane, 2,5-dimethyl-2,5-mono(t-butyl peroxy)hexane and α,α'-bis(t-butyl peroxy-m-isopropyl)benzene.

These organic peroxides are used either singly or in any combination thereof, and in a proportion of generally 0.2–10 parts by weight, preferably 0.5–8 parts by weight per 100 parts by weight of the ethylenically unsaturated nitrile-conjugated diene copolymer rubber. Their optimum amount may be suitably selected according to physical property values required.

In order to compound the individual components, the ethylenically unsaturated nitrile-conjugated diene copolymer rubber, the zinc compound, the α,β-ethylenically unsaturated carboxylic acid and the compound of an alkaline earth metal are generally kneaded in rolls, Banbury, kneader, twin-screw extruder or the like, and the organic peroxide is then added at a temperature not decomposing the organic peroxide to knead the resultant mixture.

The resultant vulcanizable rubber composition is molded in the desired form and then heated to vulcanize it. It is considered that the zinc compound and the α,β-ethylenically unsaturated carboxylic acid are reacted at a stage in which the vulcanizable rubber composition is prepared, to form the zinc salt of the α,β-unsaturated carboxylic acid.

Into the vulcanizable rubber composition according to the present invention, may be compounded various additives routinely used in rubber industry, for example, reinforcing agents such as carbon black and silica, fillers such as calcium carbonate and talc, crosslinking aids such as triallyl isocyanulate, trimethylolpropane triacrylate and m-phenylenebismaleimide, plasticizers, stabilizers, vulcanizing aids, colorants, etc.

No particular limitation is imposed on the conditions for heating and vulcanizing the vulcanizable rubber composition according to the present invention. However, the heating is generally performed in a range of from 120° to 200° C. The vulcanizing process may also be suitably selected according to the desired form, use and the like of the vulcanized rubber molding intended. It is possible to vulcanize the composition using, for example, press vulcanization by a hot platen press, direct or indirect vulcanization by a vulcanizer, or a continuous vulcanizer of the drum or open type.

The vulcanized rubber molding obtained by vulcanizing the vulcanizable rubber composition according to the present invention may be used in applications of which high tensile stress or tensile strength is required, for example, various seals such as packings, toothed belts, V-belts, soles for footwear, plates or sheets such as mats, continuous rubber plates, automotive fuel hoses, oil hoses, rubber rolls and rubber coated fabrics.

The vulcanizable rubber composition according to the present invention, which develops high tensile stress, is particularly suitable for use as a material for toothed belts. In general, a toothed belt has a structure that it comprises a main body of the belt, on which many teeth are provided at a certain pitch in the longitudinal direction of the belt, and a tooth back in which a core is embedded in the same direction, and the surface of the toothed part is covered with a covering canvas. Aromatic polyamide fibers, elastic urethane yarn, polyester fibers or the like may be used in the covering canvas. The canvas is treated with a resorcinol-formaldehyde latex as needed. Glass fibers, aromatic polyamide fibers, carbon fibers or the like may be used in the core.

The toothed belt obtained by using the vulcanizable rubber composition according to the present invention in rubber layers of the tooth back and the toothed part has high tensile stress and is hence excellent in power-transmitting ability, durability and the like. No particular limitation is imposed on the production process of the toothed belt. However, the belt can be generally molded by inserting a covering canvas, a core and a vulcanizable rubber composition in order into a mold and then vulcanizing the composition.

EXAMPLES

The present invention will hereinafter be described in more detail by the following referential examples, examples and comparative examples. However, this invention is not limited to these examples only. Incidentally, all designations of "part" or "parts" and "%" as will be used in the following referential examples, examples and comparative examples mean part or parts by weight and % by weight unless expressly noted.

In the following referential examples, examples and comparative examples, the tensile strength (TB), elongation ($E_B$) and tensile stress (100% modulus; $M_{100}$) of each vulcanized rubber sheet sample was measured in accordance with JIS K-6301 to evaluate its vulcanization properties.

[Referential Examples 1–23]

Rubber compositions composed of their corresponding formulations except respective organic peroxides shown in Tables 1 and 2 were prepared by an ordinary rubber kneader. Its corresponding organic peroxide shown in Tables 1 and 2 was added to each of the compositions at a temperature not decomposing the organic peroxide to prepare a vulcanizable rubber composition. The thus-obtained vulcanizable rubber composition was then subjected to press vulcanization under vulcanizing conditions of 170° C. and 20 minutes, thereby obtaining a vulcanized rubber sheet having a thickness of 1 mm. The measurement results of vulcanization properties are shown in Tables 1 and 2.

TABLE 1

| | Referential Example | | | | | | | | | | |
|---|---|---|---|---|---|---|---|---|---|---|---|
| | 1 | 2 | 3 | 4 | 5 | 6 | 7 | 8 | 9 | 10 | 11 |
| Composition (parts by weight) | | | | | | | | | | | |
| HNBR | 100 | 100 | 100 | 100 | 100 | 100 | 100 | 100 | — | — | — |
| NIR | — | — | — | — | — | — | — | — | 100 | — | — |
| NBIR | — | — | — | — | — | — | — | — | — | 100 | — |
| NBR | — | — | — | — | — | — | — | — | — | — | 100 |
| BR | — | — | — | — | — | — | — | — | — | — | — |
| SBR | — | — | — | — | — | — | — | — | — | — | — |
| MAA | 15 | 20 | 30 | 48 | 48 | 48 | 48 | 48 | 20 | 20 | 20 |
| ZnO | 12 | 16 | 24 | 36 | 36 | 36 | 36 | 56 | 16 | 16 | 16 |
| Mg (OH)$_2$ | 5 | 5 | 5 | 1 | 3 | 5 | — | 5 | 5 | 5 | 5 |
| MgO | — | — | — | — | — | — | 5 | — | — | — | — |
| Peroxide | 5 | 5 | 5 | 5 | 5 | 5 | 5 | 5 | 5 | 3 | 1.5 |
| Vulcanization properties | | | | | | | | | | | |
| $T_B$ (Kg/cm$^2$) | 398 | 420 | 412 | 453 | 444 | 447 | 427 | 406 | 387 | 338 | 322 |
| $E_B$ (%) | 410 | 370 | 280 | 150 | 130 | 110 | 150 | 110 | 310 | 240 | 210 |
| $M_{100}$ (Kg/cm$^2$) | 47 | 82 | 197 | 378 | 397 | 408 | 367 | 392 | 92 | 154 | 207 |

TABLE 2

| | Referential Example | | | | | | | | | | | |
|---|---|---|---|---|---|---|---|---|---|---|---|---|
| | 12 | 13 | 14 | 15 | 16 | 17 | 18 | 19 | 20 | 21 | 22 | 23 |
| Composition (parts by weight) | | | | | | | | | | | | |
| HNBR | 100 | 100 | 100 | 100 | 100 | — | — | — | — | — | — | — |
| NIR | — | — | — | — | — | 100 | — | — | — | — | — | — |
| NBIR | — | — | — | — | — | — | 100 | — | — | — | — | — |
| NBR | — | — | — | — | — | — | — | 100 | — | — | — | — |
| BR | — | — | — | — | — | — | — | — | 100 | 100 | — | — |
| SBR | — | — | — | — | — | — | — | — | — | — | 100 | 100 |
| MAA | 15 | 20 | 30 | 48 | 48 | 20 | 20 | 20 | 30 | 30 | 30 | 30 |
| ZnO | 12 | 16 | 24 | 36 | 56 | 16 | 16 | 16 | 24 | 24 | 24 | 24 |
| Mg (OH)$_2$ | — | — | — | — | — | — | — | — | — | 5 | — | 5 |
| MgO | — | — | — | — | — | — | — | — | — | — | — | — |
| Peroxide | 5 | 5 | 5 | 5 | 5 | 5 | 3 | 1.5 | 0.5 | 0.5 | 0.5 | 0.5 |

TABLE 2-continued

| | Referential Example | | | | | | | | | | | |
|---|---|---|---|---|---|---|---|---|---|---|---|---|
| | 12 | 13 | 14 | 15 | 16 | 17 | 18 | 19 | 20 | 21 | 22 | 23 |
| Vulcanization properties | | | | | | | | | | | | |
| $T_B$ (Kg/cm$^2$) | 512 | 586 | 557 | 487 | 453 | 416 | 393 | 375 | 288 | 151 | 290 | 235 |
| $E_B$ (%) | 520 | 470 | 420 | 240 | 210 | 450 | 310 | 270 | 170 | 120 | 150 | 180 |
| $M_{100}$ (Kg/cm$^2$) | 28 | 48 | 102 | 235 | 270 | 74 | 132 | 176 | 180 | 124 | 196 | 126 |

(Note):

(1) HNBR (hydrogenated NBR):

Zetpol 2020 produced by NIPPON ZEON CO., LTD., AN=36%, rate of hydrogenation=90%, iodine number=28.

(2) NIR (acrylonitrile-isoprene copolymer rubber):

Polysar 833 produced by Polysar Co., AN=33%.

(3) NBIR (acrylonitrile-butadiene-isoprene copolymer rubber):

Nipol DN-1201 produced by NIPPON ZEON CO., LTD., AN=35%.

(4) NBR (acrylonitrile-butadiene copolymer rubber):

Nipol DN-002 produced by NIPPON ZEON CO., LTD., AN=53%.

(5) BR (polybutadiene rubber):

Nipol BR1220 produced by NIPPON ZEON CO., LTD.

(6) SBR (styrene-butadiene copolymer rubber):

Nipol 1502 produced by NIPPON ZEON CO., LTD.

(7) MAA (methacrylic acid):

Methacrylic acid produced by Mitsubishi Rayon Co., Ltd.

(8) ZnO:

No. 1 zinc white produced by Seido Chemical Industry Co., Ltd. (a classified product obtained by reducing the content of coarse particles having a particle diameter of at least 20 μm to at most 5 wt. %).

(9) Peroxide:

Peroxymon F-40 produced by Nippon Oil & Fats Co., Ltd.; α,α'-bis(t-butyl peroxy-m-isopropyl)benzene (40% of purity).

In Referential Examples 1-3, 6 and 8, high tensile stress is achieved within wide compositional ranges of MAA and ZnO combined with magnesium hydroxide. More specifically, when comparing Referential Example 1 with Referential Example 12, Referential Example 2 with Referential Example 13, Referential Example 3 with Referential Example 14, Referential Example 6 with Referential Example 15, and Referential Example 8 with Referential Example 16, it is understood that tensile stress ($M_{100}$) is markedly improved in the examples in which 5 parts by weight of magnesium hydroxide were used in combination.

As demonstrated by Referential Example 4, high tensile stress is developed even when the compounding proportion of magnesium hydroxide is 1 part by weight. As demonstrated by Referential Example 7, high tensile stress is similarly achieved even when magnesium oxide is used in place of magnesium hydroxide.

As demonstrated by Referential Examples 9-11, high tensile stress is achieved even in other ethylenically unsaturated nitrile-conjugated diene copolymer rubbers in addition to HNBR. This is apparent from their comparisons with respective Referential Examples 17-19.

On the other hand, when magnesium hydroxide is used in combination in conjugated diene copolymer rubbers having no units derived from any ethylenically unsaturated nitrile as described in Referential Examples 20-23, tensile stress is rather deteriorated.

[Examples 1-12, Comparative Examples 1-9]

Rubber compositions composed of their corresponding formulations except respective organic peroxides shown in Tables 3 and 4 were prepared by kneading the respective components in a kneader. In this time, the kneading was performed with the temperature of the upper limit upon the kneading varied as shown in Tables 3 and 4. The temperature of the upper limit upon the kneading means a temperature of rubber when dumping upon the kneading by the kneader.

Its corresponding organic peroxide shown in Tables 3 and 4 was then added to each of the compositions at a temperature not decomposing the organic peroxide to prepare a vulcanizable rubber composition. The thus-obtained vulcanizable rubber composition was then subjected to press vulcanization under vulcanization conditions of 170° C. and 20 minutes, thereby obtaining a vulcanized rubber sheet having a thickness of 1 mm. The measurement results of vulcanization properties are shown in Tables 3 and 4.

TABLE 3

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Composition (parts by weight) | | | | | | | | | | | | |
| HNBR | 100 | 100 | 100 | 100 | 100 | 100 | 100 | 100 | 100 | — | — | — |
| NIR | — | — | — | — | — | — | — | — | — | 100 | — | — |
| NBIR | — | — | — | — | — | — | — | — | — | — | 100 | — |
| NBR | — | — | — | — | — | — | — | — | — | — | — | 100 |
| BR | — | — | — | — | — | — | — | — | — | — | — | — |
| SBR | — | — | — | — | — | — | — | — | — | — | — | — |
| MAA | 15 | 20 | 20 | 20 | 20 | 20 | 30 | 30 | 35 | 20 | 20 | 20 |
| ZnO | 12 | 16 | 16 | 16 | 16 | 16 | 24 | 24 | 28 | 16 | 16 | 16 |
| Ca (OH)$_2$ | 5 | 3 | 5 | — | 15 | 5 | 5 | 5 | 5 | 5 | 5 | 5 |
| CaO | — | — | — | 5 | — | — | — | — | — | — | — | — |

TABLE 3-continued

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Peroxide | 5 | 5 | 5 | 5 | 5 | 5 | 5 | 5 | 5 | 5 | 3 | 1.5 |
| Upper limit temp. upon kneading (°C.) | 140 | 138 | 142 | 140 | 136 | 162 | 143 | 163 | 142 | 145 | 142 | 143 |
| Vulcanization properties | | | | | | | | | | | | |
| $T_B$ (Kg/cm$^2$) | 508 | 565 | 569 | 573 | 548 | 578 | 563 | 552 | 532 | 407 | 378 | 382 |
| $E_B$ (%) | 480 | 430 | 440 | 460 | 410 | 450 | 430 | 430 | 360 | 440 | 290 | 280 |
| $M_{100}$ (Kg/cm$^2$) | 24 | 46 | 41 | 37 | 37 | 40 | 94 | 88 | 135 | 67 | 124 | 173 |

TABLE 4

| | Comparative Example | | | | | | | | |
|---|---|---|---|---|---|---|---|---|---|
| | 1 | 2 | 3 | 4 | 5 | 6 | 7 | 8 | 9 |
| Composition (parts by weight) | | | | | | | | | |
| HNBR | 100 | 100 | 100 | 100 | 100 | — | — | — | — |
| NIR | — | — | — | — | — | — | — | — | — |
| NBIR | — | — | — | — | — | — | — | — | — |
| NBR | — | — | — | — | — | — | — | — | — |
| BR | — | — | — | — | — | 100 | — | 100 | — |
| SBR | — | — | — | — | — | — | 100 | — | 100 |
| MAA | 20 | 20 | 30 | 30 | 20 | 30 | 30 | 30 | 30 |
| ZnO | 16 | 16 | 24 | 24 | 16 | 24 | 24 | 24 | 24 |
| Ca (OH)$_2$ | — | — | — | — | 0.1 | 5 | 5 | — | — |
| CaO | — | — | — | — | — | — | — | — | — |
| Peroxide | 5 | 5 | 5 | 5 | 5 | 0.5 | 0.5 | 0.5 | 0.5 |
| Upper limit temp. upon kneading (°C.) | 143 | 164 | 142 | 161 | 141 | 142 | 145 | 142 | 145 |
| Vulcanization properties | | | | | | | | | |
| $T_B$ (Kg/cm$^2$) | 453 | 586 | 459 | 557 | 478 | 240 | 250 | 288 | 290 |
| $E_B$ (%) | 390 | 470 | 390 | 420 | 410 | 190 | 160 | 170 | 150 |
| $M_{100}$ (Kg/cm$^2$) | 76 | 48 | 121 | 102 | 74 | 138 | 137 | 180 | 196 |

(Note):

As the respective rubber components, MAA, ZnO and Peroxide, the same substances as those shown in Tables 1 and 2 were used.

In Examples 1, 3, 7 and 9, it is understood that high tensile strength ($T_B$) is achieved within wide compositional ranges of MAA and ZnO. When comparing Comparative Examples 1 and 2 with each other, it is understood that the tensile strength of the resultant vulcanized rubber greatly varies according to changes in the kneading temperature. If the kneading temperature is high, high tensile strength is achieved. However, if the kneading temperature is low, the tensile strength does not become very high. On the other hand, the comparison between Examples 3 and 6 reveals that the vulcanizable rubber compositions containing calcium hydroxide according to the present invention have no marked difference in tensile strength even when their kneading temperatures vary widely. The same tendencies are clearly recognized in comparisons between Examples 7 and 8, and between Comparative Examples 3 and 4, in which the compounding proportion of MAA to ZnO was changed.

With respect to the compounding proportion of calcium hydroxide, its effect is recognized in a wide range from 3 parts by weight in Example 2 to 15 parts by weight in Example 5. However, if the compounding proportion of calcium hydroxide is too low-like Comparative Example 5, no significant effect is achieved. As demonstrated by Example 4, high tensile strength can be similarly achieved at a relatively low kneading temperature even when calcium oxide is used in place of calcium hydroxide.

As demonstrated by Examples 10–12, high tensile strength is achieved even in other ethylenically unsaturated nitrile-conjugated diene copolymer rubbers in addition to HNBR. On the other hand, when separately using BR and SBR as a rubber as described in Comparative Examples 6–7, high tensile strength cannot be achieved though elongation is somewhat improved even if calcium hydroxide is added.

INDUSTRIAL APPLICABILITY

The vulcanizable rubber compositions according to the present invention can provide vulcanized rubbers having excellent heat resistance and oil resistance and moreover possessing high tensile strength. Accordingly, the vulcanizable rubber compositions according to the present invention can be used as rubber materials in fields of which high tensile strength is required together with heat resistance and oil resistance, for example, wide fields of toothed belts, seals, hoses, rolls and the like.

We claim:

1. A vulcanizable rubber composition obtained by compounding, per 100 parts by weight of an ethylenically unsaturated nitrile-conjugated diene copolymer rubber, the following components:

(a) 5–80 parts by weight of an inorganic zinc compound;

(b) 5–100 parts by weight of an $\alpha, \beta$-ethylenically unsaturated mono- or dicarboxylic acid;

(c) 0.5–30 parts by weight of at least one calcium compound selected from the group consisting of calcium hydroxide and calcium oxide; and (d) 0.2–10 parts by weight of an organic peroxide.

2. A vulcanizable rubber composition according to claim 1, wherein the ethylenically unsaturated nitrile-conjugated diene copolymer rubber is a hydrogenated copolymer obtained by hydrogenating the conjugated diene units of a copolymer rubber of an ethylenically unsaturated nitrile with a conjugated diene.

3. A vulcanizable rubber composition according to claim 2, wherein the hydrogenated copolymer is a hydrogenated product of acrylonitrile-butadiene copolymer rubber.

4. The vulcanizable rubber composition according to claim 1, which is obtained by compounding, per 100 parts by weight of the ethylenically unsaturated nitrile-conjugated diene copolymer rubber, the following components:

(a) 10–60 parts by weight of the inorganic zinc compound;

(b) 20–60 parts by weight of an $\alpha,\beta$-ethylenically unsaturated mono- or dicarboxylic acid;

(c) 0.5–20 parts by weight of the calcium compound; and (d) 0.2–10 parts by weight of an organic peroxide.

5. The vulcanizable rubber composition according to claim 1, which is suitable for use as a rubber material for a toothed belt.

* * * * *

UNITED STATES PATENT AND TRADEMARK OFFICE
CERTIFICATE OF CORRECTION

PATENT NO. : 5,756,586
DATED : May 26, 1998
INVENTOR(S) : Koichi NISHIMURA et al It is certified that error appears in the above-indentified patent and that said Letters Patent is hereby corrected as shown below:

The title page item [54] col. 1 should read:

-- [54] VULCANIZABLE RUBBER COMPOSITION WITH UNSATURATED ACID METAL COMPOUNDS AND ORGANIC PEROXIDES --

Signed and Sealed this

First Day of September, 1998

Attest:

BRUCE LEHMAN

*Attesting Officer*　　　*Commissioner of Patents and Trademarks*